Sept. 25, 1923.
W. VETTEL
HELICOPTER
Filed June 7, 1922    2 Sheets-Sheet 1
1,468,847
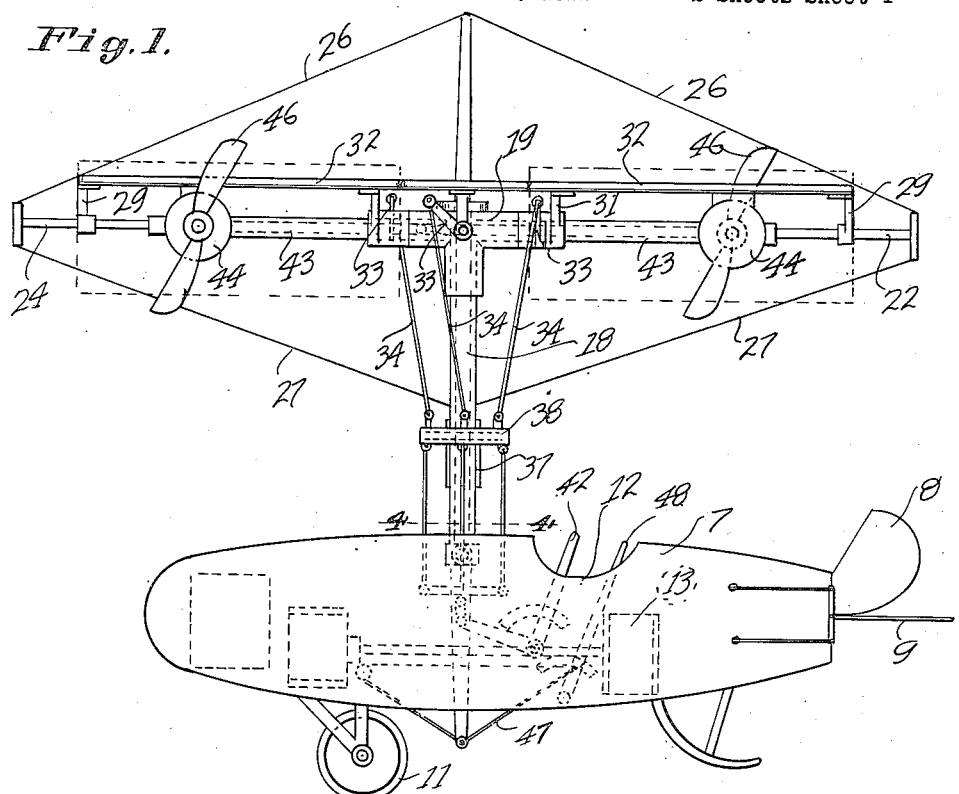
Fig. 1.
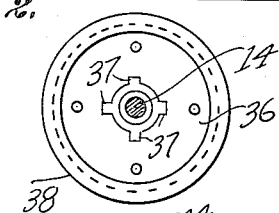
Fig. 2.
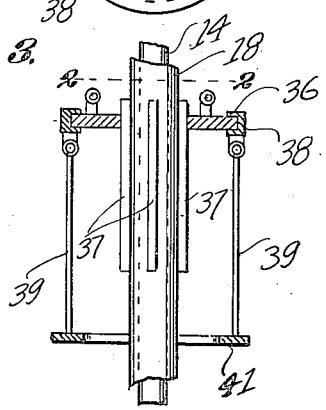
Fig. 3.
Fig. 4.
Inventor.
Willis Vettel.
Victor J. Evans
By
Attorney.

Sept. 25, 1923.

W. VETTEL

HELICOPTER

Filed June 7, 1922

1,468,847

2 Sheets-Sheet 2

Inventor,
Willis Vettel

By Victor J. Evans
Attorney.

Patented Sept. 25, 1923.

1,468,847

UNITED STATES PATENT OFFICE.

WILLIS VETTEL, OF HORNBROOK, CALIFORNIA.

HELICOPTER.

Application filed June 7, 1922. Serial No. 566,467.

*To all whom it may concern:*

Be it known that I, WILLIS VETTEL, a citizen of the United States, residing at Hornbrook, in the county of Siskiyou and State of California, have invented new and useful Improvements in Helicopters, of which the following is a specification.

This invention relates to improvements in flying machines and has particular reference to that type of flying machine commonly termed a helicopter.

The principal object of this invention is to produce a flying machine which is capable of vertical flight as well as horizontal flight.

Another object is to provide means whereby vertical movement is caused through the action of standard wing surfaces such as are commonly employed in aeroplanes.
A further object is to provide mechanism for driving these wings, which mechanism is simple in construction and therefore cheap to manufacture.

Other objects and advantages will be apparent during the course of the following description.

Figure 5:
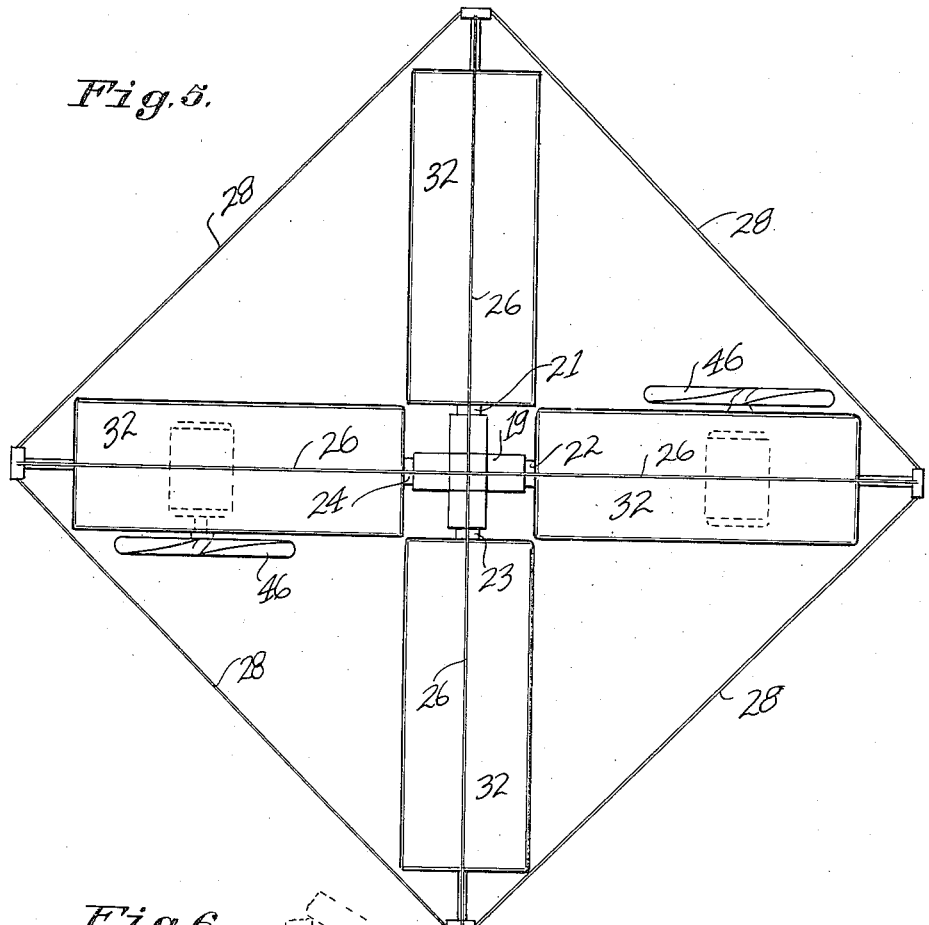
Figure 6:
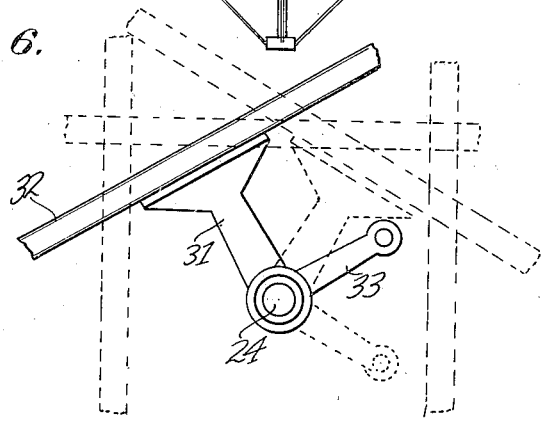

In the accompanying drawings forming a part of this specification, and in which like numerals are employed to designate like parts throughout the same, Figure 1 is a side elevation of my improved machine, Figure 2 is a cross-section taken on the line 2—2 of Figure 3, Figure 3 is a vertical detail view of the wing controlling mechanism, Figure 4 is a fragmentary detail view showing the manner of mounting the wing supporting mechanism to the fuselage, Figure 5 is a top plan view of my aeroplane, and Figure 6 is a diagrammatic view showing the manner in which my wing surfaces would be tilted.
In providing for the vertical movement for a flying machine, it is essential that means be provided for raising the flying machine, which means must have a certain factor of safety so that should the driving mechanism stop before horizontal movement is commenced, the descent will not be too rapid. Heretofore, as far as applicant is aware, flying machines of this character have relied upon oppositely revolving propellers having but a small surface. I therefore propose to obviate this difficulty by providing wings having the usual supporting surfaces of considerable area, which wings may be rotated about a central point and tipped at an angle for the purpose of getting a grip upon the air.

In the accompanying drawings wherein for the purpose of illustration is shown a preferred embodiment of my invention, the numeral 7 designates the fuselage of my machine which has the usual steering rudders 8 and 9. These rudders are controlled in the usual manner. A landing gear 11 is provided as well as a cock pit 12 within which the aviator sits. A gyroscope 13 is mounted within the fuselage and serves to prevent rotation of the fuselage about a central shaft 14. It is understood that the description thus far relates to the ordinary aeroplane construction and to which I attach my invention.

The shaft 14 is provided with trunnions 16 and 17, which trunnions are secured in bearings mounted upon the fuselage 7, as best shown in Figure 4. The shaft 14 extends upwardly from the trunnions 16 and 17 and has mounted thereon a tubular shaft 18. This tubular shaft carries a block 19 at its upper extremity, the contour of which block is best shown in Figure 5. Extending outwardly therefrom are shafts 21, 22, 23 and 24, the extremities of which are guyed as by guy wires 26, 27 and 28. These guy wires perform the usual function of keeping the shafts in their proper alignment. Mounted upon the shafts as by brackets 29 and 31 are wing surfaces 32 which wings correspond to those usually employed in aeroplanes. It will be noted that the brackets 31 secured to each wing, are provided with levers 33 formed integral therewith. These levers in turn each secured to a link 34 which extend downwardly and are in turn connected to a sliding collar 36 mounted so as to have vertical movement upon the tubular shaft 18. This shaft 18 is provided with outstanding lugs 37 which are adapted to engage grooves formed in a collar 36 so that the collar 36 will revolve with the shaft 18. This collar 36 is engaged by a ring 38 which ring has depending links 39 secured to a ring 41. This ring 41 is attached through pivots (not shown) to a controlling lever 42 for the purpose of moving the ring 40 upwardly and downwardly as will be later seen.

It will be noted that the brackets 31 which are mounted on the shafts 22 and 24 have formed therewith a tubular portion 43 which tubular portions carry at their outer extremities, a motor housing 44 within which a suitable motor is mounted. This motor in turn is connected to a propeller 46. It is obvious that these motors may be driven in any well known manner.

In order to move the shaft 14 upon its trunnions 16 and 17, I provide a cable 47 secured to the lower end of the shaft as is best shown in Figure 1. This cable is in turn connected to a lever 48 and serves as a means for moving the lower extremity of the shaft 14 forwardly and rearwardly of the fuselage.

The operation of my device is as follows:—

Assuming that the parts are in the position shown in Figure 1, and it is desired to rise vertically from the ground, a lever 48 will be moved until the shaft 14 is vertical, it of course being understood that the skid at this time would be upon the ground. The lever 42 is also moved so as to tip the wings 32 at a substantial angle for instance the angle shown in full lines in Figure 6. The motor is now started and power is transmitted through the vertical shaft 14, which power may be electrical or steam and may be transmitted in any convenient manner (not shown). This power in turn causes the propellers 46 to revolve, which revolution will serve to rotate the wings about the shaft 18 and as the wings are set at an angle, an enormous propeller is set in motion, which will result in a vertical rising of the machine. As the aeroplane reaches a desired height, the operator gradually straightens the wings to a horizontal position by moving the lever 42 at which time they will act as wing surfaces and the propellers which have been previously running will continue to run but in a different manner, as before they were revolving in opposite directions. They will now be caused to revolve in the same direction by reversing one of the motors with the result that one propeller will become a tractor propeller, while the other propeller will become a pusher propeller. A gyroscope is employed for the purpose of holding the fuselage in a stationary position so that it will not revolve with the wings which would be the tendency where the gyroscope is omitted.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, the combination with a fuselage, of a shaft pivoted to said fuselage, means for moving the lower extremity of said shaft in a plane parallel to the length of said fuselage, a tubular shaft mounted on said shaft, a series of shafts radially secured to said tubular shaft, wing surfaces mounted on said radial shafts and capable of partial rotation with respect thereto, means for simultaneously rotating said wing surfaces, said means comprising a vertically moving collar, a ring surrounding said collar, links secured to said wings and said collar, links secured to said ring and extending downwardly therefrom, a second ring, a link secured to said second ring, means for moving said second mentioned ring, and a propeller mounted adjacent the edges of two of said wings and adapted to rotate said wings about said tubular shaft.

In testimony whereof I affix my signature.

WILLIS VETTEL.